(12) United States Patent
Ishikawa et al.

(10) Patent No.: US 11,043,661 B2
(45) Date of Patent: Jun. 22, 2021

(54) POSITIVE ELECTRODE ACTIVE MATERIAL CONTAINING LITHIUM COMPOSITE OXYFLUORIDE AND ORGANOSILICON COMPOUND, AND BATTERY INCLUDING POSITIVE ELECTRODE CONTAINING THE POSITIVE ELECTRODE ACTIVE MATERIAL

(71) Applicant: Panasonic Intellectual Property Management Co., Ltd., Osaka (JP)

(72) Inventors: Takayuki Ishikawa, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 379 days.

(21) Appl. No.: 15/838,360

(22) Filed: Dec. 12, 2017

(65) Prior Publication Data
US 2018/0205087 A1    Jul. 19, 2018

(30) Foreign Application Priority Data

Jan. 19, 2017 (JP) .............................. JP2017-007185

(51) Int. Cl.
| | | |
|---|---|---|
| *H01M 4/1315* | (2010.01) | |
| *H01M 4/62* | (2006.01) | |
| *H01M 4/505* | (2010.01) | |
| *H01M 4/36* | (2006.01) | |
| *C07F 7/08* | (2006.01) | |
| *H01M 4/525* | (2010.01) | |
| *H01M 4/485* | (2010.01) | |
| *H01M 4/02* | (2006.01) | |
| *H01M 10/0525* | (2010.01) | |
| *H01M 10/0565* | (2010.01) | |
| *H01M 10/0566* | (2010.01) | |

(52) U.S. Cl.
CPC ......... *H01M 4/1315* (2013.01); *C07F 7/0834* (2013.01); *H01M 4/366* (2013.01); *H01M 4/485* (2013.01); *H01M 4/505* (2013.01); *H01M 4/525* (2013.01); *H01M 4/623* (2013.01); *H01M 4/628* (2013.01); *C01P 2002/76* (2013.01); *C01P 2006/40* (2013.01); *H01M 10/0525* (2013.01); *H01M 10/0565* (2013.01); *H01M 10/0566* (2013.01); *H01M 2004/028* (2013.01)

(58) Field of Classification Search
CPC ...... H01M 4/366; H01M 4/582; H01M 4/628; H01M 4/485; H01M 4/623; H01M 4/505; H01M 4/525; H01M 10/0525; H01M 2004/028; H01M 2004/021; H01M 4/1315; H01M 10/0566; H01M 10/0565; C07F 7/0834; C01P 2006/40; C01P 2002/76

See application file for complete search history.

(56) References Cited

U.S. PATENT DOCUMENTS

| | | | |
|---|---|---|---|
| 6,037,095 A | 3/2000 | Miyasaka | |
| 6,416,902 B1 | 7/2002 | Miyasaka | |
| 6,872,491 B2 | 3/2005 | Kanai et al. | |
| 7,429,434 B2 | 9/2008 | Mihara et al. | |
| 8,741,484 B2 | 6/2014 | Karthikeyan et al. | |
| 9,178,249 B2 | 11/2015 | Amine et al. | |
| 2002/0022183 A1 | 2/2002 | Ogawa et al. | |
| 2002/0055042 A1 | 5/2002 | Kweon et al. | |
| 2004/0202938 A1 | 10/2004 | Noguchi et al. | |
| 2004/0229123 A1 | 11/2004 | Takahashi et al. | |
| 2005/0084757 A1 | 4/2005 | Kweon et al. | |
| 2009/0136854 A1 | 5/2009 | Nakura | |
| 2009/0202892 A1 | 8/2009 | Inagaki et al. | |
| 2010/0086854 A1 | 4/2010 | Kumar et al. | |
| 2011/0247321 A1 | 10/2011 | Streeter et al. | |
| 2011/0294019 A1 | 12/2011 | Amine et al. | |
| 2013/0136987 A1 | 5/2013 | Uehara et al. | |
| 2013/0209871 A1 | 8/2013 | Kato et al. | |
| 2013/0266868 A1 | 10/2013 | Sun et al. | |
| 2014/0099549 A1 | 4/2014 | Ceder et al. | |
| 2014/0127583 A1 | 5/2014 | Han et al. | |
| 2014/0162127 A1 | 6/2014 | Kim et al. | |
| 2014/0205913 A1 | 7/2014 | Park et al. | |
| 2014/0272607 A1* | 9/2014 | Amine ................ | H01M 10/052 429/338 |
| 2015/0010819 A1 | 1/2015 | Lee et al. | |
| 2015/0090924 A1 | 4/2015 | Lee et al. | |
| 2015/0093646 A1 | 4/2015 | Kawada | |
| 2015/0214550 A1 | 7/2015 | Song et al. | |
| 2015/0228970 A1 | 8/2015 | Song et al. | |

(Continued)

FOREIGN PATENT DOCUMENTS

| | | |
|---|---|---|
| CN | 103928672 A | 7/2014 |
| EP | 2921455 A1 | 9/2015 |

(Continued)

OTHER PUBLICATIONS

ICSD Details on Search Result for Li2 (Mn O3), printed on Feb. 4, 2020.
Coban, Hüseyin Can çoban, "Metal Oxide (SnO2) Modified LiNi0.8Co0.2O2 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.
The Extended European Search Report dated Jun. 1, 2018 for the related European Patent Application No. 16827416.5.
Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.

(Continued)

*Primary Examiner* — Laura Weiner
(74) *Attorney, Agent, or Firm* — McDermott Will and Emery LLP

(57) ABSTRACT

A positive electrode active material contains a lithium composite oxyfluoride and an organosilicon compound binding to the lithium composite oxyfluoride. The organosilicon compound has insulation property.

17 Claims, 2 Drawing Sheets

(56) References Cited

U.S. PATENT DOCUMENTS

| | | |
|---|---|---|
| 2015/0380768 A1 | 12/2015 | Mizuno et al. |
| 2016/0013517 A1 | 1/2016 | Nakazawa et al. |
| 2016/0049640 A1 | 2/2016 | Takeuchi et al. |
| 2016/0372747 A1 | 12/2016 | Rolff et al. |
| 2017/0005332 A1 | 1/2017 | Chen et al. |
| 2017/0207444 A1 | 7/2017 | Yanagihara et al. |
| 2019/0088940 A1 | 3/2019 | Ceder et al. |

FOREIGN PATENT DOCUMENTS

| | | |
|---|---|---|
| JP | H01-209663 A | 8/1989 |
| JP | 7-037617 | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 | 3/2005 |
| JP | 2006-261127 A | 9/2006 |
| JP | 2006-278341 A | 10/2006 |
| JP | 2007-018874 | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.
International Search Report of PCT application No. PCT/JP2016/003950 dated Nov. 29, 2016.
International Search Report of PCT application No. PCT/JP2017/026210 dated Oct. 17, 2017.
M. Holzapfel et al., "Lithium-Ion Conductors of the System LiCo1—xFexO2, Preparation and Structural Investigation," Journal of Solid State Chemistry, 2001, 156, pp. 470-479.
S. Muhammad et al., "Deciphering the thermal behavior of lithium rich cathode material by in situ X-ray diffraction technique," Journal of Power Sources, 2015, 285, pp. 156-160.
International Search Report of PCT application No. PCT/JP2016/003956 dated Dec. 6, 2016.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Allowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 15/702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.
Notice of Allowance issued in U.S. Appl. No. 15/702,632, dated Apr. 20, 2020.
Notice of Allowance issued in U.S. Appl. No. 15/813,210, dated Apr. 22, 2020.
Notice of Allowance issued in U.S. Appl. No. 15/813,218, dated May 4, 2020.
Notice of Allowance issued in U.S. Appl. No. 15/813,212, dated May 1, 2020.

(56) References Cited

OTHER PUBLICATIONS

Notice of Allowance issued in U.S. Appl. No. 15/814,874, dated May 1, 2020.
Shuhua Ren et al., Improved Voltage and Cycling for Intercalation in High-Capacity Disordered Oxyfluoride Cathodes Advanced Science, Jun. 12, 2015, vol. 2, Issue 10, 1500128.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of LiNiO2—LiTiO2—Li [Li/3Ti2/3]O2, Lianqi Zhang, et al Journal of power Sourses, 185(2008), p. 534-p. 541.
Written Opinion for Japanese Patent Application No. 2017-540475, dated Sep. 1, 2020; with English translation.

* cited by examiner

POSITIVE ELECTRODE ACTIVE MATERIAL CONTAINING LITHIUM COMPOSITE OXYFLUORIDE AND ORGANOSILICON COMPOUND, AND BATTERY INCLUDING POSITIVE ELECTRODE CONTAINING THE POSITIVE ELECTRODE ACTIVE MATERIAL

BACKGROUND

1. Technical Field

The present disclosure relates to a positive electrode active material for a battery and to a battery.

2. Description of the Related Art

Japanese Unexamined Patent Application Publication No. 7-037617 discloses a positive electrode active material that has the crystal structure belonging to the space group R-3m and that is expressed by the formula $Li_wM_xO_yX_z$ (M denotes Co, Ni, Mn, V, Fe, or Ti; X denotes at least one halogen; and $0.2 \leq w \leq 2.5$, $0.8 \leq x \leq 1.25$, $1 \leq y \leq 2$, and $0 < z \leq 1$).

SUMMARY

In one general aspect, the techniques disclosed here feature a positive electrode active material containing a lithium composite oxyfluoride and an organosilicon compound binding to the lithium composite oxyfluoride. The organosilicon compound having insulation property.

Comprehensive or specific embodiments of the present disclosure may be implemented as a positive electrode active material for batteries, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
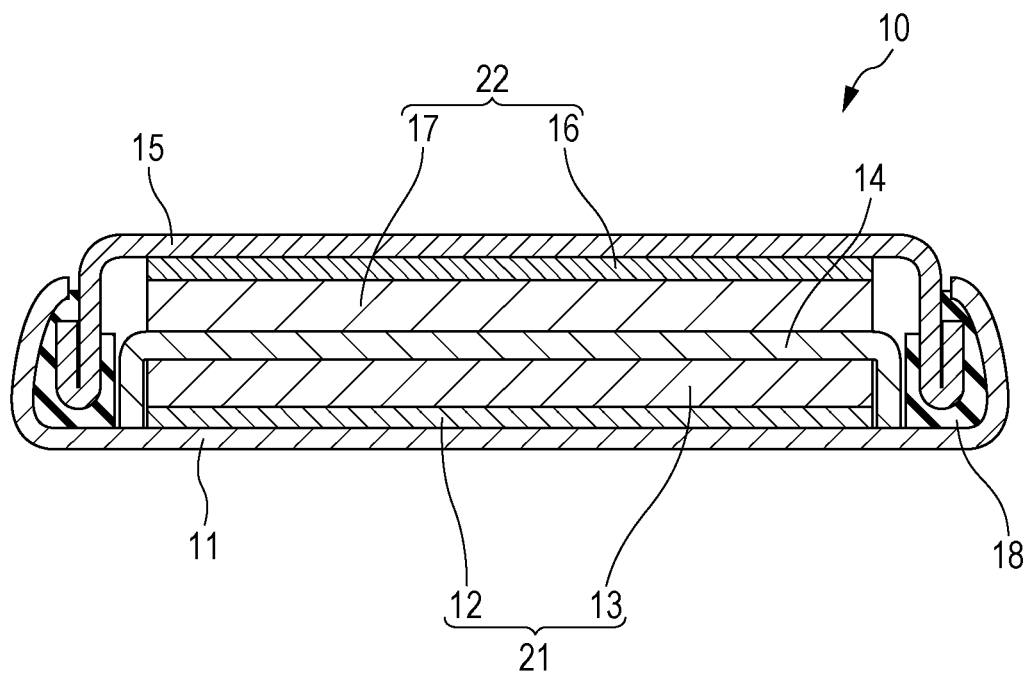
FIG. 1 is a cross-sectional view schematically illustrating a battery serving as an example of a battery in a second embodiment.

Hereinafter, embodiments of the present disclosure will be described.

First Embodiment

A positive electrode active material in a first embodiment contains a lithium composite oxyfluoride and an insulating organosilicon compound.

The above-described configuration provides a battery with high cycle characteristics.

In a case in which the above-described positive electrode active material is used to produce, for example, a lithium-ion battery, the lithium-ion battery has an oxidation-reduction potential of about 3.3 V (vs. $Li/Li^+$). The lithium-ion battery typically has a capacity retention of 60% or more after 20 charge-discharge cycles.

The term "battery with high cycle characteristics" refers to a battery having a relatively high capacity retention even after repeating a plurality of charge-discharge cycles, that is, a battery of which the capacity does not largely decrease after repeating a plurality of charge-discharge cycles.

The term "lithium composite oxyfluoride" refers to a compound obtained by partly substituting oxygen atoms of a lithium composite oxide (e.g., $LiCoO_2$) with fluorine atoms. The lithium composite oxyfluoride contains at least Li, O, and F.

In a case in which an atom on the outermost surface of the lithium composite oxyfluoride is O, H absorbs on O, thereby forming a OH group. In this case, OH groups are randomly formed because the periodic structure of O is partially substituted by F in the lithium composite oxyfluoride. Therefore, during charging and discharging, electric charge concentrates on the randomly formed OH groups, thereby promoting a side reaction, such as degradation of an electrolyte. As a result, a resistance layer is produced. In other words, for example, a battery with high cycle characteristics cannot be provided with a positive electrode active material containing only a lithium composite oxyfluoride.

Thus, the positive electrode active material in the first embodiment is subjected to a surface treatment by using a silane coupling agent. With this treatment, the OH groups can be removed by a reaction between the OH groups and the silane coupling agent. As a result, the surface of the lithium composite oxyfluoride is covered by an insulating organosilicon compound. Consequently, concentration of the electric charge on the surface of the lithium composite oxyfluoride is suppressed, and as a result, the side reaction with the electrolyte is suppressed, thereby suppressing generation of a resistance layer. Therefore, a battery with high cycle characteristics can be provided.

An organosilicon compound has, for example, a Si—O bond. In a case in which a plurality of organic silanes condense with each other, the organosilicon compound is a polysiloxane. The organosilicon compound may contain, for example, silane monomers. The organosilicon compound may contain, for example, an alkyl group or a fluoroalkyl group.

A terminal carbon atom of the organosilicon compound does not necessarily bind, for example, to a hydrogen atom. Accordingly, surface energy of the positive electrode active material is reduced, thereby improving the cycle characteristics. The end carbon atom of the organosilicon compound may bind to, for example, a fluorine atom, and further, the organosilicon compound may contain a perfluoroalkyl group.

The surface of the lithium composite oxyfluoride may be subjected to a surface treatment by using a silane coupling agent.

The term "surface treatment by using a silane coupling agent" refers to reacting a hydroxyl group (OH group) existing on the surface of a lithium composite oxyfluoride with a linking group of a coupling agent. For example, in a case in which a linking group is an alkoxy group (OR group, R refers to an alkyl group), an alcohol elimination reaction between the alkoxy group and the hydroxyl group occurs. In a case in which a linking group is a chloro group (Cl group), a hydrogen chloride (HCl) elimination reaction between the chloro group and the hydroxyl group occurs.

A silane coupling agent has at least one organic functional group and a plurality of linking groups in a molecule thereof. The organic functional group has various hydrocarbon skeletons. The linking groups provide hydroxyl groups bound directly to a metal atom by hydrolysis. A silane coupling agent may contain in the molecule thereof, for example, an organic functional group, such as an alkyl group, a mercaptopropyl group, or a trifluoropropyl group, and linking groups, such as alkoxy groups, which form silanol groups (Si—OH) by hydrolysis, or chloro groups.

The silane coupling agent may be selected from known silane coupling agents. For example, triethylchlorosilane, dimethyl(3-phenylpropyl)chlorosilane, dimethylbutylmethoxysilane, decyldimethylmethoxysilane, or 1-(chlorodimethylsilyl)dodecane may be used.

The silane coupling agent may contain three functional groups.

The above-described configuration provides a battery with higher cycle characteristics.

The silane coupling agent containing three functional groups eliminates OH groups on the surface of the positive electrode active material by reacting with the OH groups in a silane coupling reaction, and simultaneously, molecules in the silane coupling agent react with each other in the silane coupling reaction. Therefore, a dense film across a wide region of the surface of the positive electrode can be formed.

Examples of such a silane coupling agent having three functional groups include 1H,1H,2H,2H-heptadecafluorodecyltrimethoxysilane, 1,1,1-trifluoro-3-(trimethoxysilyl)propane, decyltrimethoxysilane, propyltrimethoxysilane, trifluoropropyltrimethoxysilane, perfluorooctyltrimethoxysilane, perfluorodecyltrimethoxysilane, perfluorooctyltrichlorosilane, perfluorodecyltrichlorosilane, CYTOP (registered trademark) (manufactured by Asahi Glass Co., Ltd.), and Optool (manufactured by Daikin Industries, Ltd.).

Reacting such a silane coupling agent with a lithium composite oxyfluoride forms an organosilicon compound bound to the lithium composite oxyfluoride. The formed organosilicon compound has a structure, for example, in which a hydrogen atom is removed from a terminal group of the silanol structure.

The positive electrode active material in the first embodiment may contain 5% by mass or less of the organosilicon compound relative to the whole mass of the positive electrode active material.

The above-described configuration can suppress electrochemical deactivation of the surface of the positive electrode active material, thereby reducing an increase of resistance. As a result, a battery with a higher capacity and higher cycle characteristics can be provided.

The positive electrode active material in the first embodiment may contain 0.5% by mass or more and 1.0% by mass or less of the organosilicon compound relative to the whole mass of the positive electrode active material.

The above-described configuration provides a battery with a higher capacity and higher cycle characteristics.

In the positive electrode active material in the first embodiment, the organosilicon compound may cover at least part of the surface of a lithium composite oxyfluoride.

The above-described configuration provides a battery with higher cycle characteristics.

In the positive electrode active material in the first embodiment, the organosilicon compound may cover, with a thickness of 0.1 nm or more and 2.0 nm or less, at least part of the surface of a lithium composite oxyfluoride.

The above-described configuration provides a battery with a higher capacity and higher cycle characteristics.

The thickness of 2.0 nm or less reduces inhibition of Li conduction by the organosilicon compound. The thickness of 0.1 nm or more suppresses occurrence of uneven film thickness and dielectric breakdown of the organosilicon compound.

In the positive electrode active material in the first embodiment, the organosilicon compound may form a solid solution with at least part of the surface of a lithium composite oxyfluoride.

The above-described configuration further suppresses elution (e.g., separation) of a metal element, thereby providing a battery with higher cycle characteristics.

The positive electrode active material in the first embodiment may be formed by a silane coupling reaction between a silane coupling agent in a gaseous state and a lithium composite oxyfluoride.

The above-described configuration provides a battery with higher cycle characteristics.

A silane coupling agent in a gaseous state permeates among aggregated particles of a lithium composite oxyfluoride more easily than that in a liquid state, thereby reducing the number of remaining OH groups. Therefore, a side reaction with an electrolyte on the surface of a positive electrode active material can be further suppressed.

A lithium composite oxyfluoride in the first embodiment may be a compound expressed by Formula (1).

$$Li_xMe_yO_\alpha F_\beta \qquad \text{Formula (1)}$$

Here, Me may be one or more elements selected from the group consisting of Mn, Co, Ni, Fe, Al, B, Ce, Si, Zr, Nb, Pr, Ti, W, Ge, Mo, Sn, Ca, Ba, Sr, Y, Zn, Ga, Er, La, Sm, Yb, Bi, Cu, Mg, V, and Cr.

Formula (1) may satisfy the following conditions $$1.3 \leq x \leq 2.1,$$

$$0.8 \leq y \leq 1.3,$$

$$1.8 \leq \alpha \leq 2.9, \text{ and}$$

$$0.1 \leq \beta \leq 1.2.$$

The above-described configuration provides a battery with a higher capacity and higher cycle characteristics.

In the compound expressed by Formula (1), in a case in which x is 1.3 or more, the amount of Li that can be used increases. Therefore, the capacity increases.

In the compound expressed by Formula (1), in a case in which x is 2.1 or less, the amount of Me used in the oxidation-reduction reaction increases. Therefore, the high amount of oxygen used in the oxidation-reduction reaction is not necessary. Consequently, the crystal structure is stabilized and the capacity is thereby increased.

In the compound expressed by Formula (1), in a case in which y is 0.8 or more, the amount of Me used in the oxidation-reduction reaction increases. Therefore, the high amount of oxygen used in the oxidation-reduction reaction is not necessary. Consequently, the crystal structure is stabilized and the capacity is thereby increased.

In the compound expressed by Formula (1), in a case in which y is 1.3 or less, the amount of Li that can be used increases. Therefore, the capacity increases.

In the compound expressed by Formula (1), in a case in which α is 1.8 or more, a decrease in an amount of charge compensation due to oxidation and reduction of oxygen can be prevented. Therefore, the capacity increases.

In the compound expressed by Formula (1), in a case in which α is 2.9 or less, an excessive increase in capacity due to oxidation and reduction of oxygen can be prevented, and therefore, the structure remains stable when Li deintercalates. Therefore, the capacity increases.

In the compound expressed by Formula (1), in a case in which β is 0.1 or more, the effect of F, which has a high electronegativity, increases, thereby improving cation-anion interaction. Thus, the structure remains stable when Li deintercalates. Therefore, the capacity increases.

In the compound expressed by Formula (1), in a case in which β is 1.2 or less, an increase in the effect of F, which has a high electronegativity, can be prevented, thereby improving electron conductivity. Therefore, the capacity increases.

A lithium composite oxyfluoride expressed by Formula (1) in the first embodiment may satisfy the following conditions $1.4 \leq x \leq 2.0$, $1.0 \leq y \leq 1.2$, $2.0 \leq \alpha \leq 2.5$, and $0.5 \leq \beta \leq 1.0$.

The above-described configuration provides a battery with a higher capacity and higher cycle characteristics.

In a lithium composite oxyfluoride expressed by Formula (1) in the first embodiment, in a case in which β is 0.5 or more, (i.e., the amount of fluorine is large), the amount of oxygen redox can be reduced. This can suppress oxygen elimination, thereby stabilizing the structure. Therefore, resistance to high voltage is further improved. In other words, the use of a lithium composite oxyfluoride expressed by Formula (1) in the first embodiment, in a case in which β is 0.5 or more, can provide a battery with higher cycle characteristics.

In a compound expressed by Formula (1), the ratio of "O" to "F" is expressed by $\alpha/\beta$.

A compound expressed by Formula (1) may satisfy $2 \leq \alpha/\beta \leq 5$.

The above-described configuration provides a battery with a higher capacity and higher cycle characteristics.

When $\alpha/\beta$ is 2 or more, a decrease in an amount of charge compensation due to oxidation and reduction of oxygen can be prevented. In addition, the effect of F, which is electrochemically inactive, can be suppressed, thereby increasing electron conductivity. Therefore, a battery with a higher capacity and higher cycle characteristics can be provided.

When $\alpha/\beta$ is 5 or less, an excessive increase in capacity due to oxidation and reduction of oxygen can be prevented, and therefore, the structure remains stable when Li deintercalates. In addition, due to an effect of F, which is electrochemically inactive, the structure remains stable when Li deintercalates. In addition, due to an effect of F, which has a high electronegativity, cation-anion interaction is increased, thereby improving a discharge capacity or operating voltage of the battery. In addition, due to an effect of F, which has a high electronegativity, electron localization is promoted. Therefore, oxygen elimination during charging can be suppressed.

In a compound expressed by Formula (1), Li and Me are probably located at the same site.

In a compound expressed by Formula (1), the ratio of "Li" to "Me" is expressed by x/y.

The compound expressed by Formula (1) may satisfy a condition such as $1 \leq x/y \leq 2.625$.

The above-described configuration provides a battery with a higher capacity and higher cycle characteristics.

When x/y is 1 or more, the ratio of the number of Li atoms in the site where Li is located is higher than or equal to that in existing positive electrode active materials, for example, as expressed by the formula $LiCoO_2$. Therefore, a larger amount of Li can intercalate and deintercalate.

When x/y is 2.625 or less, the amount of Me used in the oxidation-reduction reaction increases. Therefore, the high amount of oxygen used in the oxidation-reduction reaction is not necessary. In addition, when Li deintercalates during charging, the crystal structure remains stable, thereby improving the Li intercalation efficiency during discharging.

A compound expressed by Formula (1) may satisfy $1.16 \leq x/y \leq 2.0$.

The above-described configuration provides a battery with a higher capacity and higher cycle characteristics.

A lithium composite oxyfluoride in the first embodiment may have a crystal structure that belongs to the space group FM-3M or FD-3M.

The above-described configuration provides a battery with a higher capacity and higher cycle characteristics.

For example, in a case in which a lithium composite oxyfluoride has a layer structure provided by the space group R-3m, when a large amount of Li deintercalates, the layer structure cannot be maintained, and therefore, destruction of the structure is likely to occur.

In contrast, a crystal structure that belongs to the space group FM 3M or FD-3M is not destroyed even if a large amount of Li deintercalates, thereby maintaining the structure stably. In addition, in a crystal structure that belongs to the space group FM-3M or FD-3M, elements with different ionic radii are considered to be easily mixed with each other. For these reasons, a lithium composite oxyfluoride having a crystal structure that belongs to the space group FM-3M or FD-3M is suitable for providing a battery with a high capacity and high cycle characteristics.

A lithium composite oxyfluoride in the first embodiment may have a crystal structure that belongs to the space group FM-3M.

The above-described configuration provides a battery with a higher capacity and higher cycle characteristics.

In a compound expressed by Formula (1), the ratio of "Li+Me" to "O+F" (i.e., ratio of "cations" to "anions") is expressed as $(x+y)/(\alpha+\beta)$.

A compound expressed as Formula (1) may satisfy $0.86 \leq (x+y)/(\alpha+\beta) \leq 1$.

The above-described configuration provides a battery with a higher capacity and higher cycle characteristics.

When $(x+y)/(\alpha+\beta)$ is 0.86 or more, generation of impurities due to phase splitting during synthesis can be suppressed. Therefore, the capacity increases.

When $(x+y)/(\alpha+\beta)$ is 1 or less, formation of a structure in which anions are deficient can be prevented, and when Li deintercalates during charging, the crystal structure remains stable, thereby improving the Li intercalation efficiency during discharging. Therefore, the capacity increases.

When $(x+y)/(\alpha+\beta)$ is 1 or less, a structure in which cations are deficient is formed, and Li diffusion paths are further formed, thereby providing a battery with a high capacity.

In a compound expressed by Formula (1), Me may be one or two elements selected from the group consisting of Mn and Co.

The above-described configuration provides a battery with a higher capacity.

The positive electrode active material in the first embodiment may contain a lithium composite oxyfluoride as a main component (i.e., a mass ratio of 50% or more relative to the total mass of the positive electrode active material, that is, 50% by mass or more).

The above-described configuration provides a battery with a higher capacity and higher cycle characteristics.

The positive electrode active material in the first embodiment may contain a mass ratio of 70% or more of lithium composite oxyfluoride (70% by mass or more) relative to the total mass of the positive electrode active material.

The above-described configuration provides a battery with a higher capacity and higher cycle characteristics.

The positive electrode active material in the first embodiment may contain a mass ratio of 90% or more of lithium composite oxyfluoride (90% by mass or more) relative to the total mass of the positive electrode active material.

The above-described configuration provides a battery with a higher capacity and high cycle characteristics.

The positive electrode active material in the first embodiment may further contain unavoidable impurities, while containing a lithium composite oxyfluoride and an organosilicon compound.

The positive electrode active material in the first embodiment may contain at least one selected from the group consisting of starting materials used in synthesis of the positive electrode active material, by-products, and degradation products, while containing a lithium composite oxyfluoride and an organosilicon compound.

The positive electrode active material in the first embodiment may contain only a lithium composite oxyfluoride and an organosilicon compound, except for, for example, unavoidable impurities.

The above-described configuration provides a battery with a higher capacity and higher cycle characteristics.

In a compound expressed by Formula (1), Li may be partially substituted with an alkali metal such as Na or K.

Production Method of Compounds

Hereinafter, an example of production methods of the positive electrode active material in the first embodiment will be described.

A lithium composite oxyfluoride may be produced, for example, by a method described below.

A material containing Li, a material containing F, and a material containing Me are prepared.

Examples of such a material containing Li include oxides, such as $Li_2O$ and $Li_2O_2$; salts, such as LiF, $Li_2CO_3$, and LiOH; and lithium oxides, such as $LiMeO_2$ and $LiMe_2O_4$.

Examples of such a material containing F include LiF and transition metal fluorides.

Examples of such a material containing Me include oxides in various oxidation states, such as $Me_2O_3$; salts, such as $MeCO_3$ and $MeNO_3$; hydroxides, such as $Me(OH)_2$ and MeOOH; and lithium composite oxides, such as $LiMeO_2$ and $LiMe_2O_4$. When Me denotes Mn, examples of a material containing Mn include manganese oxides in various oxidation states, such as $Mn_2O_3$; salts, such as $MnCO_3$ and $MnNO_3$; hydroxides, such as $Mn(OH)_2$ and MnOOH; and lithium composite oxides, such as $LiMnO_2$ and $LiMn_2O_4$.

Each of the materials is weighed so as to satisfy the molar ratio provided in Formula (1).

Accordingly, "x", "y", "α", and "β" in Formula (1) can be changed within the conditions provided for Formula (1).

The weighed materials are mixed, for example, by a dry method or by a wet method and subjected to a mechanochemical reaction for 10 hours or more, and a lithium composite oxyfluoride is thereby obtained. A mixing device, such as a ball mill, may be used.

Substantially, materials and mixing conditions of the material mixture are changed to provide a lithium composite oxyfluoride.

The use of a lithium composite transition metal oxide as a precursor can reduce the mixing energy of each element. Accordingly, a lithium composite oxyfluoride with a higher purity can be obtained.

The composition of the obtained lithium composite oxyfluoride can be determined by, for example, ICP-optical emission spectrometry, inert gas-fusion infrared absorption analysis, and ion chromatography.

The space group of a crystal structure can be determined by powder X-ray analysis, and the lithium composite oxyfluoride can be thereby identified.

As described above, a production method of a lithium composite oxyfluoride according to one example of the first embodiment includes a step (a) of preparing materials and a step (b) of subjecting the materials to a mechanochemical reaction.

The step (a) may include a substep of preparing a mixed material by mixing the materials containing Li, F, and Me in such a manner that a molar ratio of Li to Me is 1.31 or more and 2.33 or less.

In this case, the step (a) may include a substep of producing a lithium composite oxide serving as a material by a publicly known method.

The step (a) may include a substep of preparing a mixed material by mixing the materials in such a manner that a molar ratio of Li to Me is 1.7 or more and 2.0 or less.

The step (b) may include a substep of subjecting the materials to a mechanochemical reaction by using a ball mill.

As described above, a lithium composite oxyfluoride can be synthesized by subjecting precursors (e.g., LiF, $Li_2O$, transition metal oxide, and lithium composite transition metal) to a mechanochemical reaction by using a planetary ball mill.

In this case, by changing the mixing ratio of the precursors, a larger number of Li atoms can be contained.

In contrast, in a case in which a reaction of the precursors is performed by a solid phase method, the precursors are decomposed into more stable compounds.

In other words, in a production method in which the precursors are subjected to a reaction by a solid phase method, a compound that is expressed by Formula (1) and has a crystal structure that belongs to the space group FM-3M or FD-3M cannot be obtained.

A treatment of adding a silane coupling agent to the obtained lithium composite oxyfluoride may be performed by any appropriate method, such as a silane coupling treatment, a sol-gel process, or a method using a planetary ball mill.

From the viewpoint of improving cycle characteristics, the insulating compound in a gaseous state is preferably subjected to a silane coupling reaction. In other words, a silane coupling treatment by a gas-phase reaction is preferably performed.

Compared with a silane coupling treatment by a liquid-phase reaction or a sol-gel process, in a silane coupling treatment by a gas-phase reaction, a silane coupling agent permeates easily among aggregated particles of the lithium composite oxyfluoride, thereby reducing the number of remaining OH groups. Therefore, a side reaction with an electrolyte on the surface of the positive electrode active material can be further suppressed.

Second Embodiment

Hereinafter, a second embodiment will be described. A duplicate description of the first embodiment described above is omitted where appropriate.

The battery according to the second embodiment includes a positive electrode containing a positive electrode active material according to the first embodiment, a negative electrode, and an electrolyte.

The above-described configuration provides a battery with high cycle characteristics.

A positive electrode of the battery according to the second embodiment may include a positive electrode active material layer. In this case, the positive electrode active material layer may contain a positive electrode active material according to the first embodiment as a main component (i.e., a mass ratio of 50% or more relative to the total mass of the positive electrode active material layer, that is, 50% by mass or more).

The above-described configuration provides a battery with a higher capacity and higher cycle characteristics.

Alternatively, in the battery according to the second embodiment, a positive electrode active material layer may contain a mass ratio of 70% or more of a positive electrode active material according to the first embodiment relative to the total mass of the positive electrode active material layer (70% by mass or more).

The above-described configuration provides a battery with a higher capacity and higher cycle characteristics.

Alternatively, in the battery according to the second embodiment, a positive electrode active material layer may contain a mass ratio of 90% or more of a positive electrode active material according to the first embodiment relative to the total mass of the positive electrode active material layer (90% by mass or more).

The above-described configuration provides a battery with a higher capacity and higher cycle characteristics.

The battery according to the second embodiment may be, for example, a lithium ion secondary battery, a nonaqueous electrolyte secondary battery, or an all-solid lithium battery.

In other words, in the battery according to the second embodiment, a negative electrode may contain a negative electrode active material that can occlude and release lithium. Alternatively, a negative electrode may contain, for example, a negative electrode active material that may dissolve and precipitate lithium.

In the battery according to the second embodiment, an electrolyte may be, for example, a nonaqueous electrolyte (e.g., a nonaqueous electrolyte solution).

In the battery according to the second embodiment, an electrolyte may be, for example, a solid electrolyte.

FIG. 1 is a cross-sectional view schematically illustrating a battery 10 serving as an example of a battery in a second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (e.g., a nonaqueous electrolyte solution).

The positive electrode 21, the negative electrode 22, and the separator 14 form an electrode group.

The electrode group is placed in the case 11.

The case 11 is closed with the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (e.g., aluminum, stainless steel, or an aluminum alloy).

The positive electrode current collector 12 may be omitted, and the case 11 may be used as a positive electrode current collector.

The positive electrode active material layer 13 includes a positive electrode active material according to the first embodiment.

The positive electrode active material layer 13 may contain, for example, additives (e.g., an electroconductive agent, an auxiliary material to increase ion conductivity, and a binder), if necessary.

The negative electrode 22 includes a negative electrode current collector 16 and a negative electrode active material layer 17 disposed on the negative electrode current collector 16.

The negative electrode current collector 16 is made of, for example, a metal material (e.g., aluminum, stainless steel, and an aluminum alloy).

The negative electrode current collector 16 may be omitted, and the sealing plate 15 may be used as a negative electrode current collector.

The negative electrode active material layer 17 contains a negative electrode active material.

The negative electrode active material layer 17 may contain, for example, additives (e.g., an electroconductive agent, an auxiliary material to increase ion conductivity, and a binder), if necessary.

Examples of such a negative electrode active material include metal materials, carbon materials, oxides, nitrides, tin compounds, and silicon compounds.

The metal material may be a single metal or an alloy. Examples of such metal materials include lithium metal and lithium alloys.

Examples of such carbon materials include natural graphite, coke, partially graphitized carbon, carbon fibers, spherical carbon, synthetic graphite, and amorphous carbon.

From the viewpoint of capacitance density, silicon (Si), tin (Sn), silicon compounds, and tin compounds may be used. A silicon compound and a tin compound may independently be an alloy or a solid solution.

Examples of such silicon compounds include $SiO_x$ ($0.05<x<1.95$). A compound (an alloy or a solid solution) obtained by partially substituting silicon of $SiO_x$ with another element may be used. Such another element described herein is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of such tin compounds include $Ni_2Sn_4$, $Mg_2Sn$, $SnO_x$ ($0<x<2$), $SnO_2$, and $SnSiO_3$. A single tin compound selected from the above-described compounds may be used alone, or two or more tin compounds selected from the above-described compounds may be used in combination.

The form of the negative electrode active material is not particularly limited. A negative electrode active material with a publicly known form (e.g., granular or fibrous) may be used.

A method in which lithium is supplied to (occluded in) the negative electrode active material layer 17 is not particularly limited. Specifically, examples of such a method include (a) a method in which lithium is deposited in the negative electrode active material layer 17 by a gas-phase method, such as vacuum deposition, and (b) a method in which a lithium metal foil and the negative electrode active material layer 17 are heated while being in contact with each other. In both methods, lithium can be diffused into the negative electrode active material layer 17 by using heat. There is also a method in which lithium is electrochemically occluded in the negative electrode active material layer 17. Specifically, a battery is assembled by using the negative electrode 22 that does not contain lithium and a lithium metal foil (a positive electrode). Then, the battery is charged in such a manner that lithium is occluded in the negative electrode 22.

Examples of such a binder for the positive electrode 21 and the negative electrode 22 include poly(vinylidene fluoride), polytetrafluoroethylene, polyethylene, polypropylene, aramid resin, polyimide, polyimide, polyimide-imide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, polyhexafluoropropylene, styrene-butadiene rubber, and carboxymethylcellulose. Examples of such a binder include copolymers of two or more materials selected from the group consisting of tetrafluoroethylene, hexafluoroethane, hexafluoropropylene, perfluoro(alkyl vinyl ether), vinylidene fluoride, chlorotrifluoroethylene, ethylene, propylene, pentafluoropropylene, fluoro(methyl vinyl ether), acrylic acid, and hexadiene. Furthermore, a mixture of two or more materials selected from the above-described materials may be used as such a binder.

Examples of such an electroconductive agent that may be used for the positive electrode 21 and the negative electrode 22 include graphite, carbon black, electroconductive fibers, graphite fluorides, metal powders, electroconductive whiskers, electroconductive metal oxides, and organic electroconductive materials. Examples of such graphite include natural graphite and synthetic graphite. Examples of such carbon black include acetylene black, KETJENBLACK (registered trademark), channel black, furnace black, lampblack, and thermal black. Examples of such metal powders include aluminum powders. Examples of such electroconductive whiskers include zinc oxide whiskers and potassium titanate whiskers. Examples of such electroconductive metal oxides include titanium oxides. Examples of such organic electroconductive materials include phenylene derivatives.

Materials having a high ion permeability and sufficient mechanical strength may be used as the separator 14. Examples of such materials include microporous films, woven fabrics, and nonwoven fabrics. Specifically, the separator 14 is desirably made of a polyolefin, such as polypropylene or polyethylene. The separator 14 made of polyolefin not only has excellent durability, but also exhibits a shutdown function when excessively heated. The thickness of the separator 14 is, for example, in a range of 10 μm to 300 μm (or 10 μm to 40 μm). The separator 14 may be a monolayer film made of a single material. Alternatively, the separator 14 may be a composite film (or a multilayer film) made of two or more materials. The porosity of the separator 14 is, for example, in a range of 30% to 70% (or 35% to 60%). The term "porosity" refers to a ratio of the volume of the pores relative to the total volume of the separator 14. Porosity is measured by a method, such as mercury porosimetry.

A nonaqueous electrolyte solution includes a nonaqueous solvent and a lithium salt dissolved in the nonaqueous solvent.

Examples of such a nonaqueous solvent include cyclic carbonate solvents, chain carbonate solvents, cyclic ether solvents, chain ether solvents, cyclic ester solvents, chain ester solvents, and fluorine solvents.

Examples of such cyclic carbonate solvents include ethylene carbonate, propylene carbonate, and butylene carbonate.

Examples of such chain carbonate solvents include dimethyl carbonate, ethyl methyl carbonate, and diethyl carbonate.

Examples of such cyclic ether solvents include tetrahydrofuran, 1,4-dioxane, and 1,3-dioxolane.

Examples of such chain ether solvents include 1,2-dimethoxyethane and 1,2-diethoxyethane.

Examples of such cyclic ester solvents include γ-butyrolactone.

Examples of such chain ester solvents include methyl acetate.

Examples of such fluorine solvents include fluoroethylene carbonate, methyl fluoropropionate, fluorobenzene, fluoroethyl methyl carbonate, and fluorodimethylene carbonate.

A single nonaqueous solvent selected from the above-described solvents may be used alone. Alternatively, two or more nonaqueous solvents selected from the above-described solvents may be used in combination.

The nonaqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate.

The nonaqueous electrolyte solution containing such a fluorine solvent can have higher oxidation resistance.

As a result, the battery 10 can operate stably even if charged at a high voltage.

In a battery in the second embodiment, the electrolyte may be a solid electrolyte.

Examples of such a solid electrolyte include organic polymer solid electrolytes, oxide solid electrolytes, and sulfide solid electrolytes.

Examples of such organic polymer solid electrolytes include compounds of high molecular compounds and lithium salts.

Such high molecular compounds may have an ethylene oxide structure. A high molecular compound having an ethylene oxide structure can contain a larger amount of lithium salts, thus improving ionic conductivity.

Examples of such oxide solid electrolytes include NASICON-type solid electrolytes, such as $LiTi_2(PO_4)_3$ and element-substituted derivatives thereof; $(LaLi)TiO_3$-based perovskite-type solid electrolytes; LISICON-type solid electrolytes, such as $Li_{14}ZnGe_4O_{16}$, $Li_4SiO_4$, $LiGeO_4$, and element-substituted derivatives thereof; garnet-type solid electrolytes, such as $Li_7La_3Zr_2O_{12}$ and element-substituted derivatives thereof; $Li_3N$ and H-substituted derivatives thereof; and $Li_3PO_4$ and N-substituted derivatives thereof.

Examples of such sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. To these compounds, other compounds such as LiX (X is F, Cl, Br, or I), $MO_y$, and $Li_xMO_y$ (M is P, Si, Ge, B, Al, Ga, or In; x and y are natural numbers) may be added.

Among these solid electrolytes, particularly, sulfide solid electrolytes have excellent formability and high ionic conductivity. Therefore, the use of a sulfide solid electrolyte as a solid electrolyte provides a battery with higher energy density.

In the sulfide solid electrolytes, $Li_2S-P_2S_5$ has high electrochemical stability and higher ionic conductivity. Therefore, the use of $Li_2S-P_2S_5$ as a solid electrolyte provides a battery with higher energy density.

A solid electrolyte layer may contain the nonaqueous electrolyte solution.

A solid electrolyte layer containing the nonaqueous electrolyte solution facilitates lithium ion transfer between an active material and the solid electrolyte. As a result, a battery with higher energy density is provided.

A solid electrolyte layer may contain, for example, a gel electrolyte and an ionic liquid in addition to a solid electrolyte.

A polymer material containing a nonaqueous electrolyte solution may be used as a gel electrolyte. Examples of such a polymer material include polyethylene oxide, polyacrylonitrile, polyvinylidene fluoride, and poly(methyl methacrylate), and polymers containing ethylene-oxide bonds.

Examples of the cations constituting such an ionic liquid include chain aliphatic quaternary salts, such as tetraalkylammonium and tetraalkylphosphonium; alicyclic ammoniums, such as pyrrolidiniums, morpholiniums, imidazoliniums, tetrahydropyrimidiniums, piperaziniums, and piperidiniums; and nitrogen-containing heterocyclic aromatic compounds, such as pyridiniums and imidazoliums. Examples of the anions constituting such an ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

Examples of such a lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A single lithium salt selected from the above-described lithium salts may be used alone. Alternatively a mixture of two or more lithium salts selected from the above-described lithium salts may be used. The concentration of such a lithium salt is, for example, in a range of 0.5 mol/l to 2 mol/l.

Batteries according to the second embodiment may be of various types, such as coin batteries, cylinder batteries, prismatic batteries, sheet batteries, button batteries, flat batteries, and stacked batteries.

EXAMPLES

Example 1

Production of Positive Electrode Active Material $Li_2O$, LiF, $MnO_2$, and $LiMnO_2$ were weighed in a molar ratio of $Li_2O/LiF/MnO_2/LiMnO_2=0.1/0.5/0.1/1.1$.

The materials were placed into a 45 cc zirconia container with an appropriate amount of $\phi$, 3 mm zirconia balls, and the container was sealed in an argon glove box.

The zirconia box was removed from the argon glove box, and the materials were treated by using a planetary ball mill at 600 rpm for 30 hours.

Figure 2:
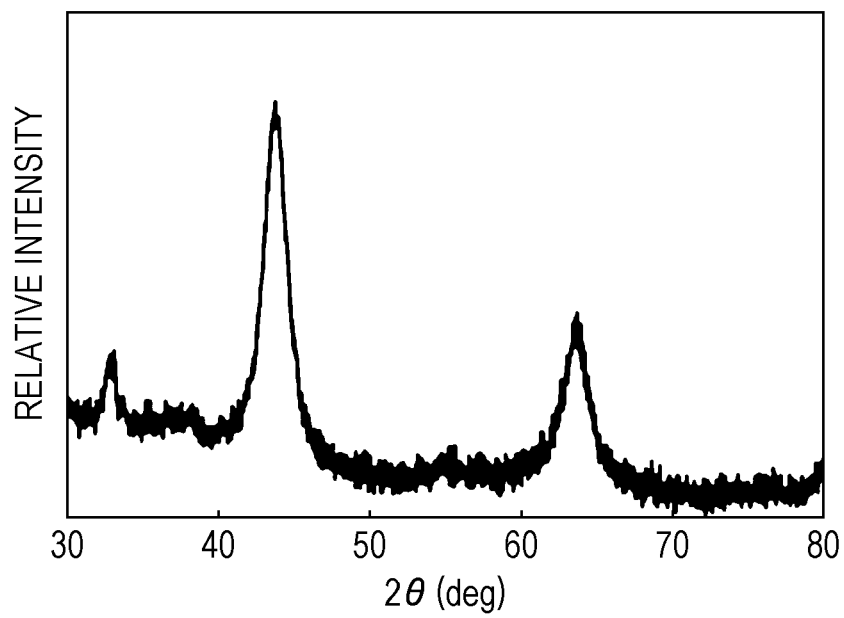
FIG. 2 is a powder X-ray diffraction chart of a positive electrode active material in Example 1.

The obtained compound was subjected to powder X-ray diffractometry. The result of the measurement is shown in FIG. 2.

The space group of the obtained compound was FM-3M.

The composition of the obtained compound was determined by ICP-optical emission spectrometry, inert gas-fusion infrared absorption analysis, and ion chromatography.

As a result, the obtained compound had a composition of $Li_{1.8}Mn_{1.2}O_{2.5}F_{0.5}$.

The lithium composite oxyfluoride (0.5 g) obtained as described above was placed into a Teflon (registered trademark) container, and 0.2 g of 1H,1H,2H,2H-heptadecafluorodecyltrimethoxysilane serving as a silane coupling agent was placed into another Teflon container. The two containers were further placed into another large Teflon container and sealed in the argon glove box.

The large Teflon container was placed into a vacuum drying oven, and a gas-phase reaction at 150° C. for 10 hours followed by drying was performed, and a positive electrode active material was thereby obtained.

The obtained positive electrode active material was observed by X-ray photoelectron spectroscopy.

As a result, Si, which is a component of 1H,1H,2H,2H-heptadecafluorodecyltrimethoxysilane, was detected on the surface of $Li_{1.8}Mn_{1.2}O_{2.5}F_{0.5}$. In other words, it was confirmed that an organosilicon compound covered the surface of the $Li_{1.8}Mn_{1.2}O_{2.5}F_{0.5}$.

Production of Batteries

Next, 70 parts by mass of the positive electrode active material and 20 parts by mass of an electroconductive agent, 10 parts by mass of polyvinylidene fluoride (PVDF), and an appropriate amount of N-methylpyrrolidone (NMP) were mixed. This provided a positive electrode mixture slurry.

The positive electrode mixture slurry was applied to one surface of a positive electrode current collector made of aluminum foil having a thickness of 20 μm.

Drying and rolling the positive electrode mixture slurry provided a positive electrode plate having a positive electrode active material layer and a thickness of 60 μm.

Stamping the obtained positive electrode plate into a circular form having a diameter of 12.5 mm provided a positive electrode.

Stamping lithium metal foil having a thickness of 300 μm into a circular form having a diameter of 14.0 mm provided a negative electrode.

Mixing fluoroethylene carbonate (FEC), ethylene carbonate (EC), and ethyl methyl carbonate (EMC) with each other in a volume ratio of 1:1:6 provided a nonaqueous solvent.

Dissolving $LiPF_6$ in the nonaqueous solvent at a concentration of 1.0 mol/l provided a nonaqueous electrolyte solution.

The obtained nonaqueous electrolyte solution was infiltrated into a separator (manufactured by Celgard, LLC., No. 2320, thickness: 25 μm), which is a trilayer separator formed of a polypropylene layer, a polyethylene layer, and a polypropylene layer.

By using the positive electrode, the negative electrode, and the separator, a CR2032-type coin battery was produced in a dry box in which a dew point was controlled to be −50° C.

Example 2

A method for the silane coupling reaction different from that in Example 1 was employed.

A solution obtained by diluting 0.2 g of 1H, 1H, 2H, 2H-heptadecafluorodecyltrimethoxysilane with 200 ml of Novec 7200 (registered trademark) (manufactured by 3M Co., ltd.) and 0.5 g of a compound expressed by $Li_{1.8}Mn_{1.2}O_{2.5}F_{0.5}$ were placed into the argon glove box.

After stirring the solution and the compound, a liquid-phase reaction followed by drying was performed, and a positive electrode active material was thereby obtained.

By using the obtained positive electrode active material, a coin battery was produced in the same manner as in Example 1.

Examples 3 to 5

A silane coupling agent different from that in Example 1 was employed.

Table 1 shows the silane coupling agents used in Examples 3 to 5.

Positive electrode active materials in Examples 3 to 5 were obtained in the same manner as in Example 1, except for the silane coupling agents.

By using the obtained positive electrode active materials in Examples 3 to 5, coin batteries were produced in the same manner as in Example 1.

Example 6

The composition of the lithium composite oxyfluoride was changed from that in Example 1.

$Li_2O$, LiF, $MnO_2$, and $Mn_2O_3$ were weighed in a molar ratio of $Li_2O/LiF/MnO_2/Mn_2O_3=0.45/0.5/0.5/0.35$.

The obtained materials were treated in the same manner as in Example 1 to obtain a lithium composite oxyfluoride.

The space group of the obtained lithium composite oxyfluoride was FM-3M.

The obtained lithium composite oxyfluoride had a composition of $Li_{1.4}Mn_{1.2}O_{2.5}F_{0.5}$.

A coin battery was produced in the same manner as in Example 1, except for the composition of the lithium composite oxyfluoride.

Example 7

The composition of the lithium composite oxyfluoride was changed from that in Example 1.

$Li_2O$, LiF, and $Mn_2O_3$ were weighed in a molar ratio of $Li_2O/LiF/Mn_2O_3=0.5/1.0/0.5$.

The obtained materials were treated in the same manner as in Example 1 to obtain a lithium composite oxyfluoride.

The space group of the obtained lithium composite oxyfluoride was FM-3M.

The obtained lithium composite oxyfluoride had a composition of $Li_2MnO_2F$.

A coin battery was produced in the same manner as in Example 1, except for the composition of the lithium composite oxyfluoride.

Example 8

The composition of the lithium composite oxyfluoride was changed from that in Example 1.

LiF and $LiCoO_2$ were weighed in a molar ratio of $LiF/LiCoO_2=1.0/1.0$.

The obtained materials were treated in the same manner as in Example 1 to obtain a lithium composite oxyfluoride.

The space group of the obtained lithium composite oxyfluoride was FM-3M.

The obtained lithium composite oxyfluoride had a composition of $Li_2CoO_2F$.

A coin battery was produced in the same manner as in Example 1, except for the composition of the lithium composite oxyfluoride.

Comparative Examples 1 to 4

Lithium composite oxyfluorides were produced in the same manner as in Example 1 and Examples 6 to 8.

Table 1 shows compositions of the lithium composite oxyfluoride used in Comparative Examples 1 to 4.

However, in Comparative Examples 1 to 4, the silane coupling reaction was not performed.

A coin battery was produced in the same manner as in Example 1, except that the silane coupling reaction was not performed.

Evaluation of Batteries

The current density of the positive electrode was set at 1.0 mA/cm$^2$, and the batteries in Examples 1 and 2 were charged until the voltage reached 4.9 V.

Next, the discharge final voltage was set at 2.5 V, and the batteries in Examples 1 and 2 were discharged at a current density of 1.0 mA/cm$^2$.

Such charge and discharge was performed repeatedly for 20 cycles. A capacity retention of the batteries after 20 charge-discharge cycles (hereinafter, referred to as a capacity retention after 20 cycles) was measured.

The battery in Example 1 had a capacity retention after 20 cycles of 86%.

The battery in Example 2 had a capacity retention after 20 cycles of 81%.

The capacity retention after 20 cycles of the battery in Comparative Example 1 was measured in the same manner as in Examples 1 and 2.

The battery in Comparative Example 1 had a capacity retention after 20 cycles of 76%.

Figure 3:
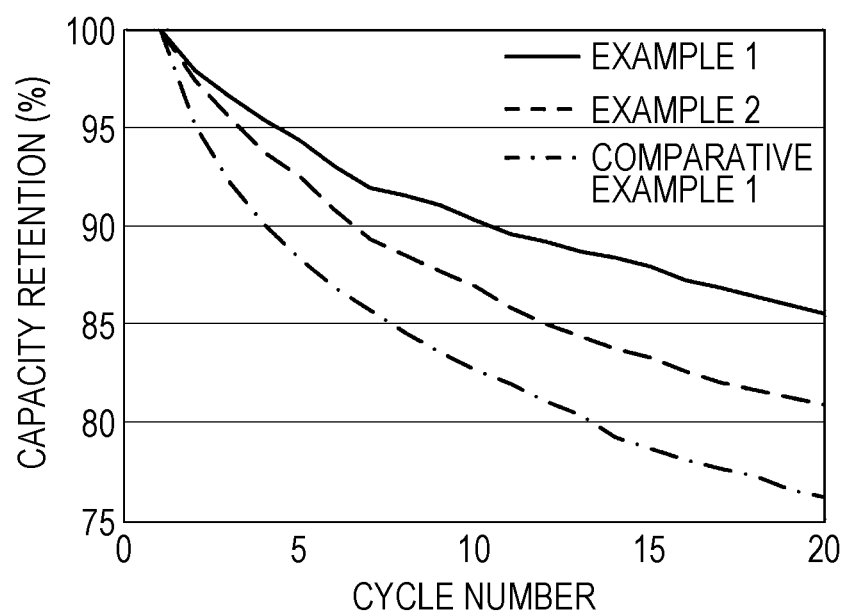
FIG. 3 illustrates a result of a charge-discharge cycle test for the batteries in Examples 1 and 2 and Comparative Example 1.

FIG. 3 shows the results of charge-discharge cycle tests of the batteries in Examples 1 and 2 and Comparative Example 1.

The capacity retentions after 20 cycles of the batteries in Examples 3 to 8 and Comparative Examples 2 to 4 were measured in the same manner as in Examples 1 and 2 and Comparative Example 1.

Table 1 shows the above-described results.

TABLE 1

| Sample | Lithium composite oxyfluoride | Insulating compounds | Capacity retention after 20 cycles (%) |
|---|---|---|---|
| Example 1 | $Li_{1.8}Mn_{1.2}O_{2.5}F_{0.5}$ | 1H,1H,2H,2H-heptadecafluorodecyltrimethoxysilane (gas phase) | 86 |
| Example 2 | $Li_{1.8}Mn_{1.2}O_{2.5}F_{0.5}$ | 1H,1H,2H,2H-heptadecafluorodecyltrimethoxysilane (liquid phase) | 81 |

TABLE 1-continued

| Sample | Lithium composite oxyfluoride | Insulating compounds | Capacity retention after 20 cycles (%) |
|---|---|---|---|
| Example 3 | $Li_{1.8}Mn_{1.2}O_{2.5}F_{0.5}$ | 1,1,1-trifluoro-3-(trimethoxysilyl)propane (gas phase) | 83 |
| Example 4 | $Li_{1.8}Mn_{1.2}O_{2.5}F_{0.5}$ | decyltrimethoxysilane (gas phase) | 83 |
| Example 5 | $Li_{1.8}Mn_{1.2}O_{2.5}F_{0.5}$ | propyltrimethoxysilane (gas phase) | 82 |
| Example 6 | $Li_{1.4}Mn_{1.2}O_{2.5}F_{0.5}$ | 1H,1H,2H,2H-heptadecafluorodecyltrimethoxysilane (gas phase) | 80 |
| Example 7 | $Li_2MnO_2F$ | 1H,1H,2H,2H-heptadecafluorodecyltrimethoxysilane (gas phase) | 75 |
| Example 8 | $Li_2CoO_2F$ | 1H,1H,2H,2H-heptadecafluorodecyltrimethoxysilane (gas phase) | 64 |
| Comparative Example 1 | $Li_{1.8}Mn_{1.2}O_{2.5}F_{0.5}$ | — | 76 |
| Comparative Example 2 | $Li_{1.4}Mn_{1.2}O_{2.5}F_{0.5}$ | — | 70 |
| Comparative Example 3 | $Li_2MnO_2F$ | — | 50 |
| Comparative Example 4 | $Li_2CoO_2F$ | — | 45 |

Table 1 shows that the batteries in Examples 1 to 8 have a capacity retention after 20 cycles of 64% to 87%.

Table 1 shows that each of the batteries in Examples 1 to 8 has a higher capacity retention after 20 cycles than the corresponding battery in Comparative Examples, the corresponding battery having the same composition of the lithium composite oxyfluoride as that in Examples.

In other words, the batteries in Examples 1 to 5 have a higher capacity retention after 20 cycles than the battery in Comparative Example 1.

The battery in Example 6 has a higher capacity retention after 20 cycles than the battery in Comparative Example 2.

The battery in Example 7 has a higher capacity retention after 20 cycles than the battery in Comparative Example 3.

The battery in Example 8 has a higher capacity retention after 20 cycles than the battery in Comparative Example 4.

Regarding the reason for such results, it is considered that, in Examples 1 to 8, the silane coupling reaction eliminated OH groups on the surface of the lithium composite oxyfluoride. It is considered that this suppressed the concentration of electric charge on the surface, and therefore, the side reaction with the electrolyte was suppressed, thereby suppressing formation of a resistance layer, which led to the improvement of cycle characteristics.

Table 1 shows that the battery in Example 2 has a lower capacity retention after 20 cycles than the battery in Example 1.

Regarding the reason for the result, it is considered that, in Example 2, the silane coupling reaction was performed as a liquid-phase reaction, and accordingly, a silane coupling agent in a liquid state did not sufficiently permeate among the aggregated particles of the positive electrode active material and did not react sufficiently with OH groups. As a result, it is considered that the number of remaining OH groups in Example 2 was more than that in Example 1 in which synthesis was performed in a gas-phase reaction, and the side reaction with the electrolyte on the surface was not sufficiently suppressed, thereby degrading cycle characteristics.

Table 1 shows that the battery in Example 3 has a lower capacity retention after 20 cycles than the battery in Example 1.

Regarding the reason for the result, it is considered that molecular chains of surface functional groups of the organosilicon compound in Example 3 were shorter than those in Example 1, and therefore, intermolecular forces were decreased, and as a result, a dense film was not formed on the surface of the lithium composite oxyfluoride. Accordingly, it is considered that the contact area with the electrolyte solution increased, and the side reaction was not sufficiently suppressed, thereby degrading cycle characteristics.

Table 1 shows that the batteries in Examples 4 and 5 have a lower capacity retention after 20 cycles than that in Example 1.

Regarding the reason for the result, it is considered that the surfaces of the organosilicon compounds in the batteries in Examples 4 and 5 were covered with H, and as a result, the surface energy was higher than that in Example 1. Therefore, it is considered that the wettability of the electrolyte solution increased, and the side reaction was promoted, thereby degrading cycle characteristics. In other words, it is considered that a terminal carbon atom of the organosilicon compound in Example 1 did not bind to H, and therefore, surface energy decreased, thereby improving cycle characteristics.

Table 1 shows that the batteries in Examples 7 and 8 have considerably higher capacity retention after 20 cycles than those in Comparative Examples 3 and 4.

This is probably because the batteries in Examples 7 and 8 had a higher ratio of F in the lithium composite oxyfluorides than those in Examples 1 to 6 (i.e., the lithium composite oxyfluorides are $Li_2MnO_2F$ and $Li_2CoO_2F$). It is considered that, in a case in which a ratio of F in the lithium composite oxyfluoride was high, the periodicity of OH groups on the surface of the lithium composite oxyfluoride was further degraded, thereby promoting the concentration of electric charge and the side reaction. As a result, it is considered that the elimination of OH groups due to the silane coupling reaction considerably suppressed the concentration of electric charge and the side reaction. It is considered that, therefore, the cyclic characteristics of the batteries in Examples 7 and 8 were further improved compared with those in Examples 1 to 6.

The above-mentioned results show that a positive electrode active material that contains, in addition to a lithium composite oxyfluoride, an organosilicon compound considerably improves the cycle characteristics of a battery. In other words, the above-described results indicate considerable advantages that are unique to a lithium composite oxyfluoride and are not seen in a typical lithium composite oxide not containing F (e.g., $LiCoO_2$).

It can be estimated that the above-described results are also obtainable in a case in which Me is substituted with an element other than Mn in the formula $Li_xMe_yO_\alpha F_\beta$.

What is claimed is:

1. A positive electrode active material, comprising:
a lithium composite oxyfluoride, wherein the lithium composite oxyfluoride is present as particles; and
an organosilicon compound binding to the lithium composite oxyfluoride through chemical bonds, the organosilicon compound having insulation property to suppress concentration of electric charge on surface of the lithium composite oxyfluoride,
wherein the lithium composite oxyfluoride is represented by a composition formula $Li_xMe_yO_\alpha F_\beta$, Me represents at least one selected from the group consisting of Mn, Co, Ni, Fe, Al, B, Ce, Si, Zr, Nb, Pr, Ti, W, Ge, Mo, Sn, Ca, Ba, Sr, Y, Zn, Ga, Er, La, Sm, Yb, Bi, Cu, Mg, V, and Cr, $1.3 \leq x \leq 2.1$; $0.8 \leq y \leq 1.3$; $1.8 \leq \alpha \leq 2.9$; $0.1 \leq \beta \leq 1.2$, and $2 \leq \alpha/\beta \leq 5$.

2. The positive electrode active material according to claim 1, wherein the organosilicon compound is polysiloxane.

3. The positive electrode active material according to claim 1,
wherein the organosilicon compound includes a fluoroalkyl group.

4. The positive electrode active material according to claim 3, wherein the organosilicon compound contains a perfluoroalkyl group.

5. A battery comprising:
a positive electrode containing the positive electrode active material according to claim 3;
a negative electrode; and
an electrolyte.

6. The positive electrode active material according claim 1, wherein
the organosilicon compound covers at least part of a surface of the particles.

7. The positive electrode active material according to claim 6, wherein a coating layer of the organosilicon compound covering at least part of the surface of the particles has a thickness of 0.1 nm or more and 2.0 nm or less.

8. The positive electrode active material according to claim 1, wherein the positive electrode active material contains the lithium composite oxyfluoride with a mass ratio of 50% or more and 90% or less to a total mass of the positive electrode active material.

9. The positive electrode active material according to claim 1, wherein Me represents at least one selected from the group consisting of Mn and Co.

10. The positive electrode active material according to claim 1, wherein the organosilicon compound comprises an organic functional group, and a terminal carbon atom of the organic functional group does not directly bind to a hydrogen atom.

11. A battery comprising:
a positive electrode containing the positive electrode active material according to claim 1;
a negative electrode; and
an electrolyte.

12. The battery according to claim 11, wherein the negative electrode includes:
a negative electrode active material into and from which lithium ion is reversibly occluded and released; or
a material on which lithium metal is reversibly precipitated and dissolved, and
the electrolyte is a nonaqueous electrolyte solution.

13. The battery according to claim 11, wherein the negative electrode includes:
a negative electrode active material into and from which lithium ion is reversibly occluded and released; or
a material on which lithium metal is reversibly precipitated and dissolved, and
the electrolyte is a solid electrolyte.

14. A positive electrode active material comprising:
a lithium composite oxyfluoride, wherein the lithium composite oxyfluoride is present as particles; and
an organosilicon compound binding to the lithium composite oxyfluoride through chemical bonds, the organosilicon compound having insulation property to suppress concentration of electric charge on surface of the lithium composite oxyfluoride,
wherein the lithium composite oxyfluoride is represented by a composition formula $Li_xMe_yO_\alpha F_\beta$, where Me represents at least one selected from the group consisting of Mn, Co, Ni, Fe, Al, B, Ce, Si, Zr, Nb, Pr, Ti, W, Ge, Mo, Sn, Ca, Ba, Sr, Y, Zn, Ga, Er, La, Sm, Yb, Bi, Cu, Mg, V, ans Cr; $14 \leq x \leq 2.0$, $1.0 \leq y \leq 1.2$, $2.0 \leq \alpha \leq 2.5$, and $0.5 \leq \beta \leq 1.0$.

15. The positive electrode active material according to claim 14, wherein the organosilicon compound is polysiloxane.

16. The positive electrode active material according to claim 14, wherein the organosilicon compound includes a fluoroalkyl group.

17. A battery comprising:
a positive electrode containing the positive electrode active material according to claim 14;
a negative electrode; and
an electrolyte.

* * * * *